(12) United States Patent
Umbehocker et al.

(10) Patent No.: US 7,043,614 B2
(45) Date of Patent: May 9, 2006

(54) STORAGE SERVICES AND SYSTEMS

(75) Inventors: Steven Michael Umbehocker, Mercer Island, WA (US); Allen Unueco, Bellevue, WA (US); Ankur Kemkar, Cupertino, CA (US); Shaloo K. Chaudhary, Santa Clara, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 646 days.

(21) Appl. No.: 10/194,524

(22) Filed: Jul. 11, 2002

(65) Prior Publication Data
US 2004/0010666 A1    Jan. 15, 2004

(51) Int. Cl.
*G06F 12/00* (2006.01)

(52) U.S. Cl. ...................... 711/162; 711/156
(58) Field of Classification Search ............... 711/156, 711/203, 162; 714/6
See application file for complete search history.

(56) References Cited

U.S. PATENT DOCUMENTS

| 5,634,096 | A | * | 5/1997 | Baylor et al. ............... 714/6 |
| 6,038,639 | A | * | 3/2000 | O'Brien et al. ............. 711/114 |
| 6,047,294 | A | * | 4/2000 | Deshayes et al. ........... 707/204 |
| 6,173,293 | B1 | * | 1/2001 | Thekkath et al. ........... 707/201 |
| 6,757,778 | B1 | * | 6/2004 | van Rietschote ............... 711/6 |
| 6,772,231 | B1 | * | 8/2004 | Reuter et al. ................... 710/8 |
| 6,775,790 | B1 | * | 8/2004 | Reuter et al. .................. 714/5 |
| 6,795,966 | B1 | * | 9/2004 | Lim et al. ....................... 718/1 |
| 2002/0019908 | A1 | | 2/2002 | Reuter et al. |
| 2002/0019920 | A1 | | 2/2002 | Reuter et al. |
| 2002/0112113 | A1 | * | 8/2002 | Karpoff et al. ................. 711/4 |

FOREIGN PATENT DOCUMENTS

WO    WO 01/38987    5/2001

OTHER PUBLICATIONS

Lee et al. "Petal: Distributed Virtual Disks" ACM ASPLOS VII, Oct. 1996 p. 84-92.*
International search report application No. PCT/US 03/21801 mailed Jan. 23, 2004.

* cited by examiner

*Primary Examiner*—Mano Padmanabhan
*Assistant Examiner*—Paul Baker
(74) *Attorney, Agent, or Firm*—Meyertons Hood Kivlin Kowert & Goetzel, P.C.; B. Noël Kivlin

(57) ABSTRACT

Storage services and systems are provided. Virtual disks include a number of storage states and are associated with storage operations that are provided with the virtual disks. Moreover, a storage management set of executable instructions is configured based on values assigned to the states when the storage operations are performed against the virtual disks. In some embodiments, a selection set of executable instructions permits the selective execution of the storage operations.

17 Claims, 6 Drawing Sheets

STORAGE SERVICES AND SYSTEMS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright © 2002, VERITAS Software Company, All Rights Reserved.

FIELD OF THE INVENTION

The present invention is related to storage services and systems, and more particularly to services and systems that assist in creating frozen images, mirrors, and/or splits of storage in a shared storage environment.

BACKGROUND INFORMATION

Storage networking is the practice of connecting storage devices to computing devices (e.g., clients, servers, and the like) by using networks (e.g., Fibre Channel, Internet Small Computer System Interface (iSCSI), and others) instead of traditional point-to-point small computer system interface (SCSI) channels. A network used to connect servers to storage devices is referred to as a storage area network (SAN). Within a SAN environment, computing devices have access to the available storage devices. This presents a wide variety of benefits, including server platform fail-over wherein a failed storage device and failed server are automatically recovered by another operational server platform and operational storage device without requiring any recabling of the operational storage devices.

One aspect of storage management is the ability to create storage access transparency, which is often referred to as storage virtualization. Storage virtualization conceals the physical storage details from user/client applications that access the physical storage. Storage virtualization can optimize storage utilization and storage access throughput, so that multiple user/client applications can optimally and reliably access physical storage in a shared storage environment consisting of heterogeneous physical storage devices. Also, with storage virtualization the user/client applications are not required to manage the underlying details and interfaces associated with the physical storage devices.

Another aspect of effective storage management is the ability to backup or mirror the storage data residing on the physical storage devices, such that the data is redundantly available from multiple physical storage devices or recoverable from a previous point in time. The data redundancy permits the storage data to remain available should one of the physical storage devices housing the storage data fail or become otherwise unavailable to a user/client application (e.g., server failures, application failures, and the like). The data recoverability permits users to acquire desired versions of the data from a previous point in time.

Conventionally, a few techniques are used to backup storage data on multiple physical storage devices. First, storage data can be copied from one physical storage device to another physical storage device by taking a snapshot of the storage data associated with a primary physical storage device and then copying the storage data to a second backup physical storage device. To achieve this, a frozen image of the storage data is taken at a given moment in time from the primary physical storage device. In creating the frozen image a series of operations must be performed to ensure transactional consistency of the snapshot operation. For example, some operations will suspend applications accessing the storage data and flush from cache pending storage data altering operations (e.g., write operations). Secondly, storage data can be mirrored, such that when the storage data housed on the primary physical storage is altered, a mirrored storage data altering operation occurs on a mirrored second physical storage device.

Typically, when providing storage virtualization, storage management techniques will interject a middle layer of software that is interposed between user applications and the interfaces of the underlying physical storage devices. This middle layer of software is capable of centrally managing the physical storage devices and creating a virtual view of the storage data. In some cases the middle layer of software is embodied as a Volume Manager (VM) application. The VM will can also execute storage services (e.g., frozen images, mirrors, and the like) against the storage data in order to ensure High Availability (HA) of the underlying storage data.

Yet, in heterogeneous shared storage environments, the frozen images and mirrors are presented to the VM in a variety of different ways based on the different configurations and interfaces of the physical storage devices. Often, the differences exist because a number of the physical storage devices are provided from different vendors and correspondingly the physical storage devices provide disparate storage capabilities to the VM.

As a result, a VM operating in a heterogeneous shared storage environment becomes unduly complex with an abundance of complex exception software coding that is designed to handle disparate storage capabilities. The storage capabilities dictate how the storage data is managed and what can be done with any frozen image or mirror created with a particular storage operation.

Therefore, there is a need for techniques that provide improved storage services and systems, such that more consistency and normalization are available independent of the underlying interfaces provided by disparate physical storage devices.

SUMMARY OF THE INVENTION

According to one aspect of the present invention, a method to provide storage operations is presented. State flags are associated with a virtual disk, where the virtual disk is bound to one or more storage devices. Moreover, the virtual disk is provided with access to a prepare operation and a split operation. Additionally, a storage management set of executable instructions is configured based on one or more values assigned to each of the state flags of the virtual disk, when at least one of the prepare operation and the snapshot operation are processed.

According to another aspect of the present invention, a storage operation system is provided. The storage operation system includes a virtual disk, a storage management set of executable instructions, and a selection set of executable instructions. The virtual disk is associated with a plurality of states, a snapshot operation, and a prepare operation. The storage management set of executable instructions manages the virtual disk and is configured by the operations. Further, the selection set of executable instructions permit the selective execution of the operations.

According to yet another aspect of the present invention, a virtual disk data structure residing on a computer readable medium is presented. The virtual disk data structure includes storage metadata, a plurality of storage states, and a plurality of storage operation mappings. The storage metadata is associated with storage data residing on one or more storage devices. Moreover, the plurality of storage states is associated with processing states of the virtual disk data structure, and the plurality of storage operation mappings provide access to storage operations. Furthermore, values associated with the plurality of storage states determine which of the plurality of storage operations that can be processed by accessing the storage operation mappings.

DESCRIPTION OF THE PREFERRED EMBODIMENTS

In the following detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

As used herein, a "storage management application" or a "storage management set of executable instructions" includes software applications or modules that manage storage resources on behalf of user/client applications or host applications. In some instances, storage management applications are Volume Manager (VM) applications processing in a shared storage environment, such as a Storage Area Network (SAN) environment or TCP/IP using iSCSI. User/client applications or host applications are applications that interface with the storage management applications to gain access to storage resources.

A virtual disk (VD) is a logical representation of physical storage data as it resides on one or more physical storage devices. The storage management set of executable instructions manages the VD and makes the VD available to the user/client applications or host applications. In some embodiments of the present invention, a single VD is actually a group of VDs. In still more embodiments, interfaces of the physical storage devices create VDs that are then managed by the storage management set of executable instructions.

Figure 1:
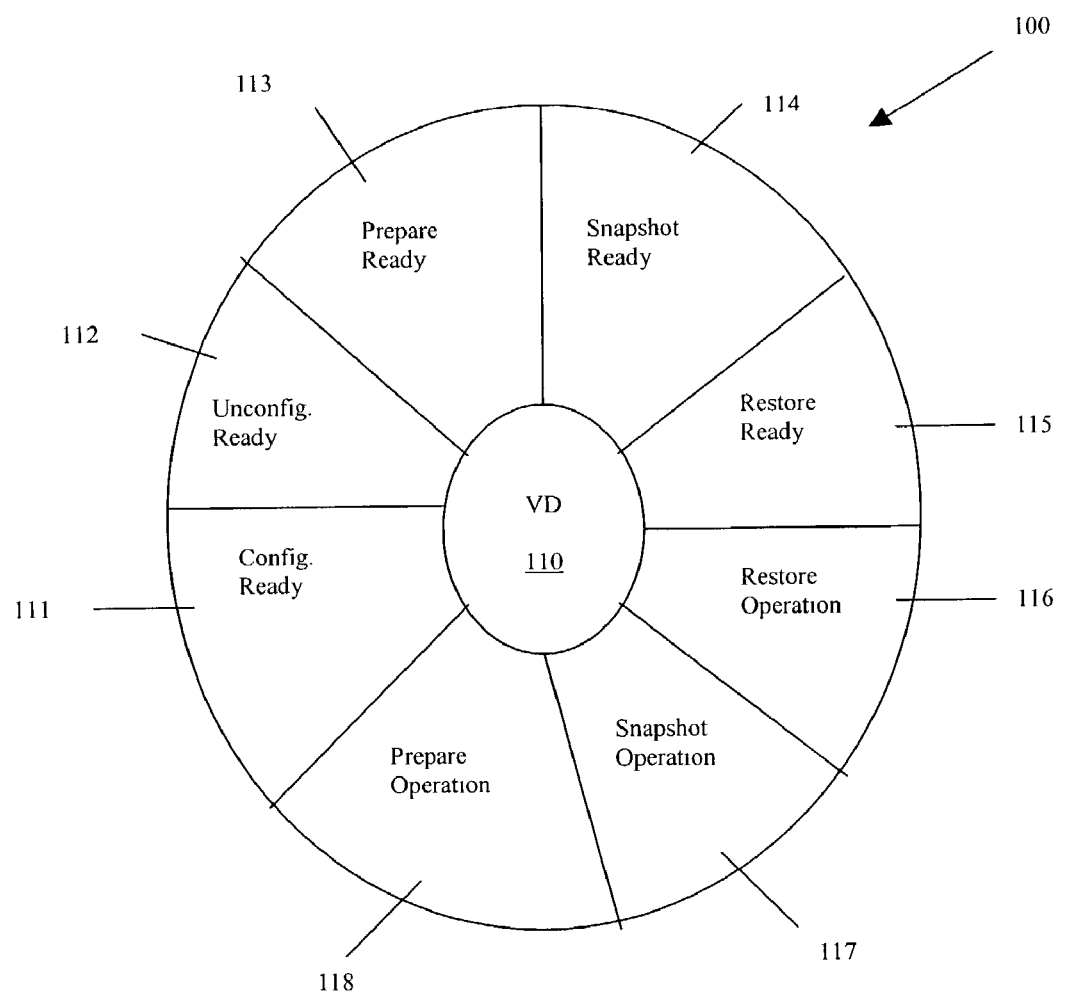
FIG. 1 shows a diagram of a virtual disk, according to the present invention.

FIG. 1 illustrates a diagram 100 of one VD 110 according to the present invention. The VD 110 is associated with a number of storage states (e.g., 111–115) and storage operations (e.g., 116–118). In one embodiment, the VD 110 is a group of VDs. Furthermore, the VD 110 represents a logical view of physical storage data for one or more physical storage devices. Storage management applications (e.g., VMs and the like), user/client applications, and host applications interact with the VD 110 and not directly with the underlying physical storage. The VD 110 includes metadata used to acquire the underlying physical storage data as it resides on the physical storage devices.

A storage operation is a one or more processes necessary to create or manage a frozen image of the VD 110. As previously discussed, frozen image capabilities are provided in different ways for different underlying physical storage interfaces and for different physical storage device configurations (e.g., storage array configurations). Some techniques for creating frozen images include data mirroring, copy-on-write techniques, and the like. Using one technique versus another will have different implications on how the physical storage device configurations will be managed, what can be done with any created frozen image, and how long it will take to create the frozen image. The VD 110 of FIG. 1 permits the normalization of potentially disparate frozen image processes into a standard process by utilizing storage states (e.g., 111–115) and storage operations (e.g., 116–118) that are associated with the VD 110.

In one embodiment of the VD 110, there are five storage state flags (e.g., 111–115), namely a configure-ready state flag 111, an unconfigure-ready state flag, a prepare-ready state flag 113, a snapshot-ready state flag 114, and a restore-ready state flag 115. These state flags (e.g., 111–115) can include a false/unset value or a true/set value. Moreover, the values assigned to the state flags (e.g., 111–115) indicate which of the storage operations (e.g., 116–118) that can be performed against the underlying physical storage devices associated with the VD 110 by using the VD's 110 metadata. In one embodiment, three storage operations (e.g., 116–118) are provided: a restore operation 116, a snapshot operation 117, and a prepare operation 118.

The configure-ready state flag 111 provides an indication as to whether the VD 110 is in a state that permits the VD 110 to be reconfigured. If a particular configuration of the underlying physical storage devices is associated with a hardware mirroring technique, then the configure-ready state flag 111 can be used to indicate that a VD's 110 physical device can now be associated with another VD's 110 physical device for purposes of synchronizing or mirroring the storage data between the two physical devices. Furthermore, for storage device configurations associated with storage arrays that use a copy-on-write technique, no indication from the configure-ready state flag 111 is needed at all, and correspondingly the configure-ready state flag 111 can be constantly set to false for such configurations.

Values associated with the unconfigure-ready state flag 112 indicate whether the VD 110 is in a state such that the VD 110 can have its association with another VD 110 removed or not. This allows for re-association with another VD 110 so that multiple frozen images associated with the storage data of the VD 110 can be taken. Again, for storage device configurations associated with storage arrays that use a copy-on-write technique, no unconfigure-ready state flag 112 is used, and correspondingly the unconfigure-ready state flag 112 can be typically set to false.

Values associated with the prepare-ready state flag 113 indicate whether the VD 110 is in a state such that the associated VD's 110 storage device can be configured for a prepare operation 118. In some cases, this is can be an establish operation to mirror the VD 110 with another VD's 110 storage device. If the mirrored VD's 110 storage device is split off, then setting the prepare-ready state flag 113 to true will make the mirrored VD's 110 storage device non accessible. For storage device configurations that are associated with storage arrays that do not use data mirroring techniques, the prepare-ready state flag 113 can be set to true in order to reabsorb the storage used by a previously processed snapshot process (e.g., previous frozen image creation), thereby essentially deleting any previously created storage clone. As one of ordinary skill in the art readily appreciates, by using the prepare-ready state flag 113 in combination with the prepare operation 118, storage administrators can take as much time as needed to synchronize VDs with the physical storage devices, since the prepare-ready state flag 113 provides a technique to separate the prepare operation 118 from a snapshot operation 117 (e.g., frozen image creation operation).

Values associated with the snapshot-ready state flag 114 indicate whether the VD 110 is in a state that permits a frozen image/snapshot of the VD 110 to be taken. In some embodiments if the underlying configuration of the physical storage devices permit, the snapshot-ready state flag 114 can be set to true on any created frozen images as well, thus permitting frozen images to be taken from other frozen images.

Values associated with the restore-ready state flag 115 indicate whether the VD 110 is in a state such that a previously taken frozen image of the VD 110 can be written over the original VD 110. This allows a reverse establish to occur or a restore operation 116 to occur on the VD 110 from another VD 110 having storage data associated with the previously taken frozen image.

The VD 110 can be in multiple states (e.g., 111–115) at any given moment in time. Storage administrators can configure the storage states (e.g., 111–115) for the VD 110 at any point in time, when the storage operations (e.g., 116–118) become available for the underlying physical storage devices associated with the VD 110. Moreover, if the VD 110 is a group of VDs or is associated with multiple underlying physical storage devices, the state flags (e.g., 111–115) are automatically set to values, such that the group of VDs defaults to a least common denominator operation (e.g., 116–118) of the group.

For example, if a storage management set of executable instructions (e.g., VM and the like) includes some VDs 110 that support the restore operation 116 while there exists other VDs 110 that do not support the restore operation 116, the restore-ready state flag 115 is automatically and constantly set to false, thereby not exposing the execution of the restore operation 116 to execution for any of the VDs 110.

Similarly, the snapshot operation 117 can be restricted based on the capabilities of the underlying physical storage devices associated with the VD 110. For example, if the VD 110 is associated with a group of VDs where half of the VDs have their prepare-ready flags 113 set to true and half of the VDs have their snapshot-ready flags 114 set to true, then the prepare operation 118 will complete processing against the VDs 110 having the prepare-ready flags 113 set to true, before the snapshot operation 117 is processed on the VDs 110 having the snapshot-ready flags 114 set to true. In this way, access to some of the storage operations (e.g., 116–118) can be held in abeyance until other storage operations (e.g., 116–118) have completed.

Furthermore, any storage management set of executable instructions (e.g., VMs and the like) can be automatically configured based on the successful execution of the storage operations (e.g., 116–118). For example, the metadata of the VDs 110 associated with the underlying physical storage data can be automatically updated for the storage management set of executable instructions upon completion of one or more of the storage operations (e.g., 116–118). Moreover, automatic imports and exports can be performed to make any frozen image created by the storage operations (e.g., 116–118) visible to the storage management set of executable instructions after a successful snapshot operation 117.

In some embodiments, a HA extension to the VD 110 of FIG. 1 can be used to integrate storage cluster features in order to augment the storage operations (e.g., 116–118). This can include operations that permit the assignment of a destination VD 110 for a snapshot operation 117 performed on a VD 110 that is associated with a group of VDs 110. The snapshot results can be automatically imported onto a client/host and into a storage management set of executable instructions. Moreover, in some embodiments, an automatic fail over operation can be integrated to copy any frozen image created by the storage operations (e.g., 116–118) to a second VD 110 or destination VD 110. Of course it is readily recognized by one of ordinary skill in the art, that a variety of additional operations and state flags can be used to enhance the processing of storage services with FIG. 1. All such enhancements are into to fall within the broad scope of the present invention.

Figure 2:
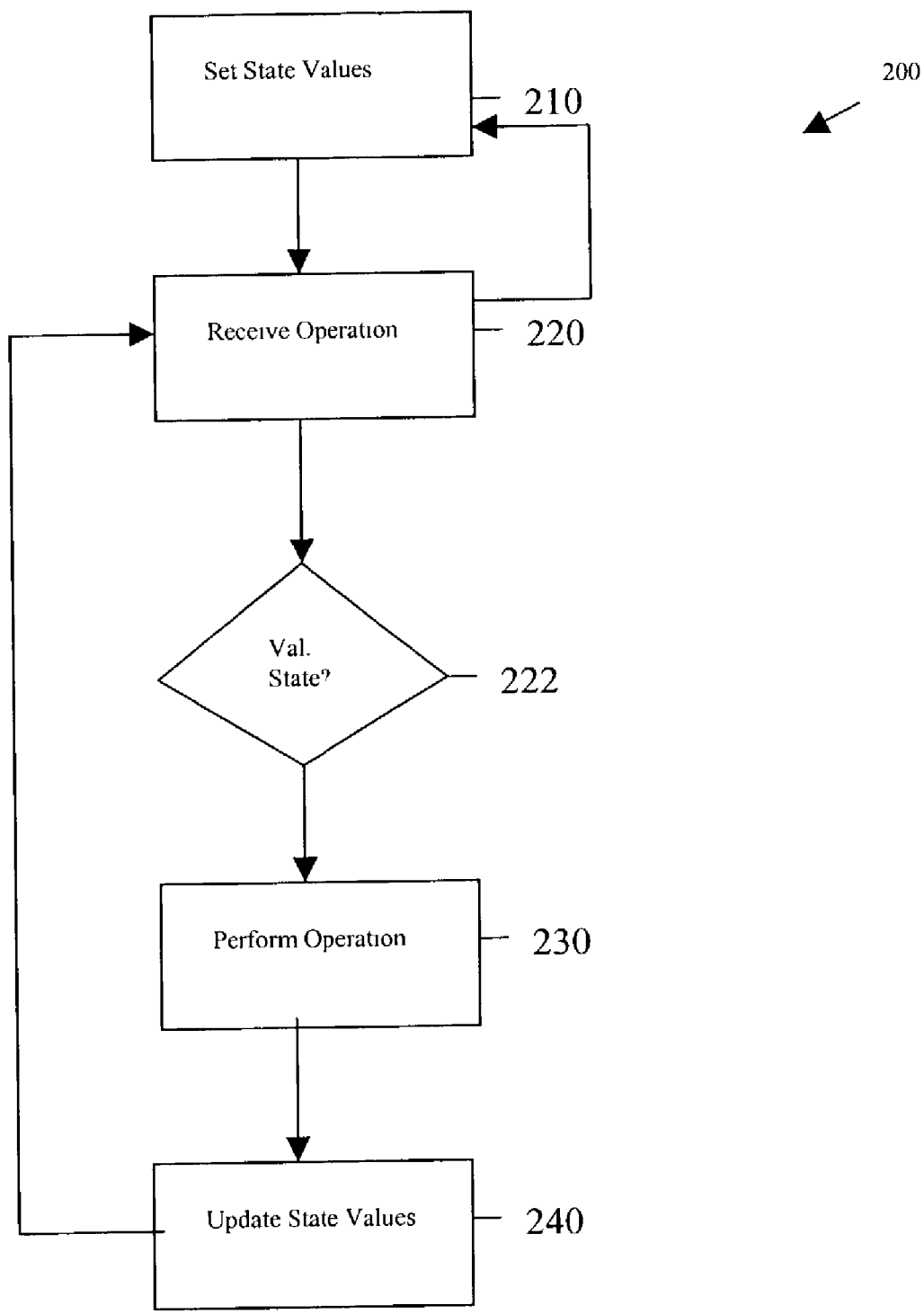
FIG. 2 shows a flow diagram of a method of processing storage operations, according to the present invention.

FIG. 2 illustrates flow diagram of a method 200 of processing storage operations according to the present invention. Initially, physical storage data is logically represented as one or more VD data structures. In some embodiments, physical storage device interfaces, which control the physical storage data, are indirectly accessible through the VD data structures. Moreover, a single VD data structure can represent multiple VD data structures. The VD data structures are used by storage management applications to provide storage virtualization to user/client applications or host applications. In this way, the user/client applications or the host applications need not be concerned with the details of the physical storage devices associated with storage data that is logically embodied by a VD data structure.

Each VD data structure is associated with a plurality of storage states that are relevant to performing storage operations against the VD data structure. These storage states can be represented as storage state flags having values of true or false, indicating whether the state flags are set or not set, respectively. Moreover, in some embodiments, the state flags include, a configure-ready state flag, an unconfigure-ready state flag, a prepare-ready state flag, a snapshot-ready state flag, and a restore-ready state flag. Any set values determine whether at any given moment in time, a storage operation can be permissibly performed against the VD data structure. In one embodiment, the storage operations include a restore operation, a snapshot operation, and a prepare operation.

The restore operation permits the data associated with a previously taken frozen image to be copied into an original VD data structure to perform a restore on the original VD data structure. The snapshot operation permits a frozen image to be taken from the VD data structure and stored in a second VD data structure. The prepare operation configures a VD data structure for an establish operation, a split operation, or another storage operation.

In block 210, the values for the state flags are set for the VD data structure. In some embodiments, the interfaces associated with the physical storage devices are altered to permit initial and subsequent setting of the values associated with the state flags. In this way, administrators or vendors can determine when storage services for particular storage devices will become available or will not be available based on the configurations of the underlying physical storage devices. Accordingly, in block 210, the state values can be automatically set based on processing results of one or more of the storage operations. Alternatively, in block 210, a storage administrator can manually set the state values. Moreover, in some embodiments, a provider set of executable instructions can be interposed between the storage device interfaces and the storage management set of executable instructions to set the state values for the VD.

In block 220, a storage operation is received. The storage operation can be received directly from a storage management set of executable instructions (e.g., VMs and the like) or from a user/client application or host application being processed by a storage administrator. In block 222, upon receiving a request to process a storage operation against the VD data structure, a check is made to determine if the VD data structure is in a valid state to perform the received storage operation.

In some embodiments, where the VD data structure is associated with a group of VD data structures a least common denominator rule can be enforced, such that the state is deemed invalid in block 222 if any of the VD data structures are associated with invalid state flag values necessary to successfully perform the received storage operation. Furthermore, in some cases, the received operation can become valid after the performance of another storage operation. In these cases, the received storage operation is held in abeyance until the states of the entire group of VD data structures permit the received storage operation to be performed.

In block 230, once the value associated with the state flag is valid, the received storage operation is processed against the VD data structure. In block 240, upon conclusion of processing the received storage operation, the appropriate values for the state flags are updated for the VD data structure. Next, in block 220, processing continues when another storage operation is received.

Figure 3:
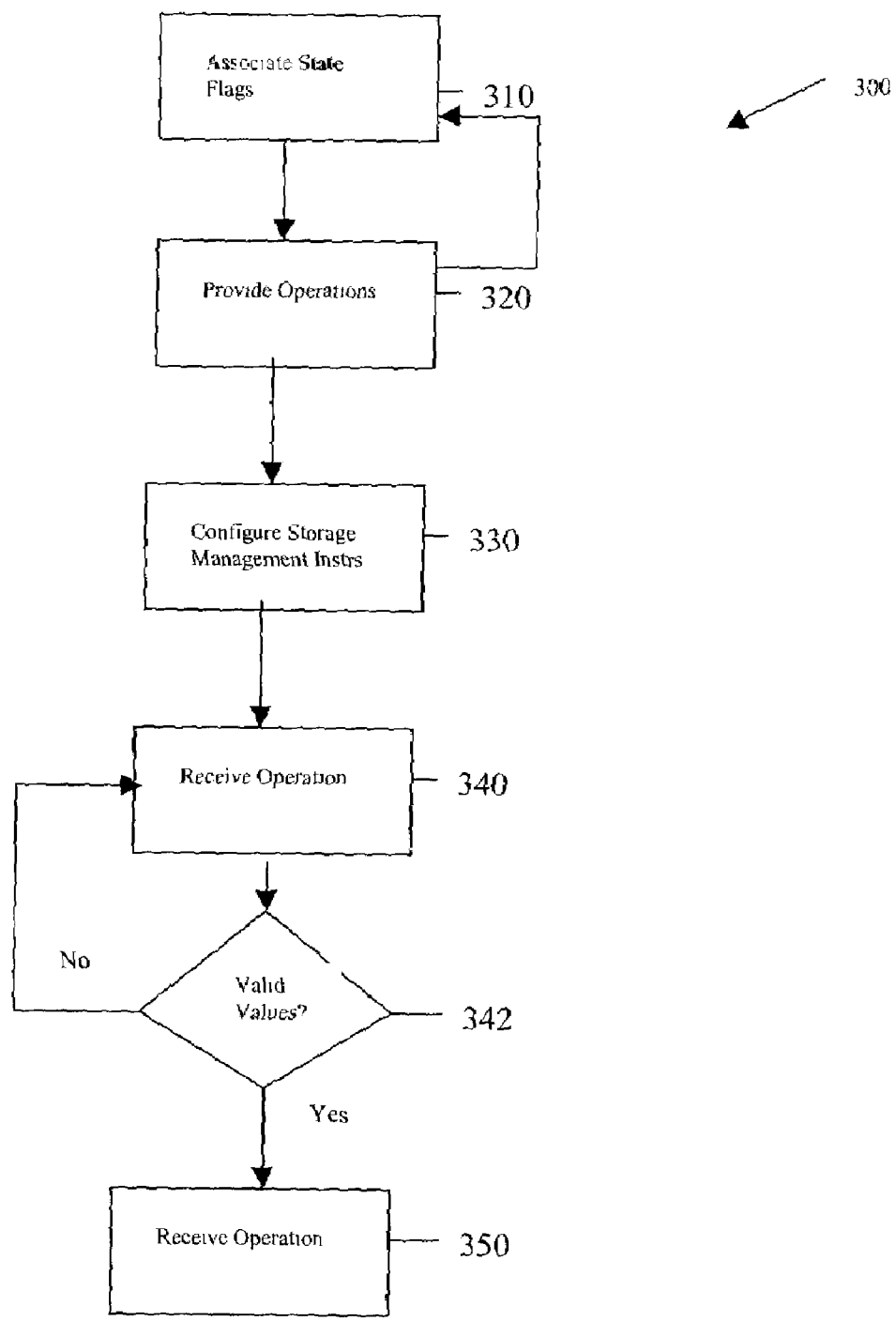
FIG. 3 shows a flow diagram of a method of providing storage operations, according to the present invention.

FIG. 3 illustrates a flow diagram of a method 300 for providing storage operations according to the present invention. In block 310, state flags are associated with a VD. The state flags include values that are used to determine whether a particularly desired storage operation can be properly performed against the VD, given the present state of the VD. The VD logically represents storage data associated with one or more physical storage devices. Moreover, in some embodiments, a single VD can represent a plurality or grouping of VDs. Further, the underlying configurations of the storage devices can dictate the values for a number of the state flags.

In some embodiments, the state flags represent five states: a configure-ready state, an unconfigure-ready state, a prepare-ready state, a snapshot-ready state, and a restore-ready state. The configure-ready state's value indicates whether the VD can be reconfigured or not. In some cases, the underlying configuration of the storage devices will force the configure-ready state's value to constantly be set to false. The unconfigure-ready state's value indicates whether the VD can be disassociated with another VD. In some instances, the underlying configuration of the storage devices will force the unconfigure-ready state's value to constantly be set to false.

The prepare-ready state's value indicates whether a prepare operation can be permissibly performed against the VD. The prepare operation readies the VD for establish or split operations being performed against the VD. Moreover, for storage devices that do not permit data mirroring, the prepare-ready state's value can be set to true to reabsorb storage used by a prior created frozen image. The snapshot-ready state's value indicates whether the VD can have a snapshot operation performed against the VD in order to create a frozen image of the VD. Frozen images of previously taken frozen images are permissible. The restore-ready state's value indicates whether a restore operation can be performed against the VD to restore the VD with previously taken frozen image.

In block 320, storage operations are provided with the VD. The operations include a prepare operation to prepare the VD for an establish operation, a spilt operation, or another storage operation (e.g., a mirror operation), and a restore operation to overwrite the VD with a previously taken frozen image. Of course as will be appreciated by one of ordinary skill in the art, a variety of additional storage operations can be provided without departing from the present invention. Some of these operations can include integration of storage cluster features by permitting the assignment of destination VDs, and importation of previously taken snapshots into a storage management set of executable instructions (e.g., VMs and the like) on the destination VDs. Additionally, an operation can permit, under the appropriate conditions, fail over of a frozen image to another VD.

Furthermore, in block 330, a storage management set of executable instructions is automatically configured based on the values assigned to the state flags when at least one of the storage operations is performed against the VD. For example, the underlying physical mappings associated with the storage data of any created frozen image can be automatically imported or exported, as the case may be, into the storage management set of executable instructions so that the newly created frozen image is visible and accessible to the storage management set of executable instructions upon the successful conclusion of a split operation. Similarly, the underlying physical mappings can be automatically imported or exported onto a host-computing environment.

In block 340 a storage operation is received or requested. In some cases, this operation is received from a storage management set of executable instructions. In other cases, the storage operation is received directly from a user/client set of executable instructions or a host set of executable instructions, such as when a storage administrator is manually performing a storage operation. In block 342, once a requested storage operation is received, then the values currently assigned to the VD are validated to determine if the requested storage operation can be performed or held in abeyance until other storage operations complete processing against the VD. In some embodiments, where the VD represents a group of VDs, each value assigned to the state flags for each of the VDs within the group can be required to be validated before the requested operation is permitted to proceed.

In block 350, once the values associated with the state flags of the VD permit the requested storage operation to be performed, the requested storage operation is performed. Upon the conclusion of the processing of the requested storage operation, the storage management set of executable instructions is appropriately configured and the values of the state flags are automatically updated/reset as needed.

Also, in some embodiments, the VD is associated with a first storage device and a second storage device, where the first storage device is different than the second storage device. For example, the configuration of the first storage device can permit data mirroring, while the configuration of the second storage device may not permit data mirroring. Moreover, the interfaces associated with the first storage device and the second storage device can be different, as when the first and second storage devices are provided by different hardware vendors. Alternatively, the interfaces can be different releases/versions of an interface provided by the same hardware vendor.

Figure 4:
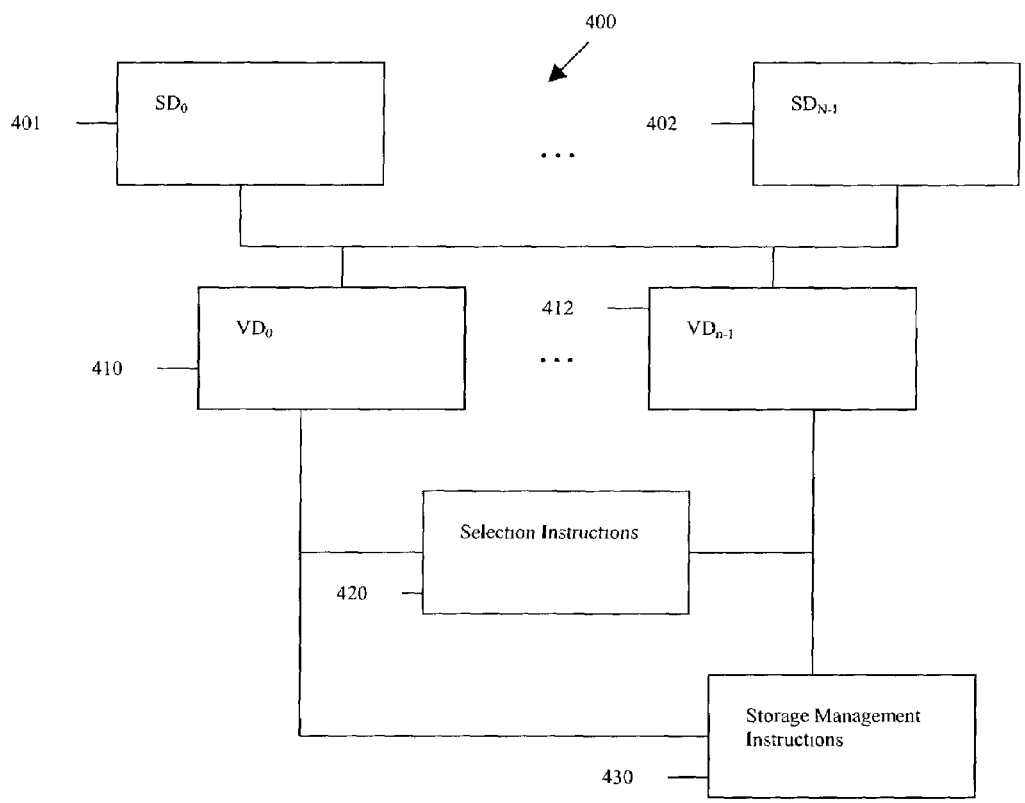
FIG. 4 shows a diagram of a storage operation system, according to the present invention.

FIG. 4 illustrates a diagram of a storage operation system 400, according to the present invention. The storage operation system 400 includes one or more VDs (e.g., 410–412), a storage management set of executable instructions 430, and a selection set of executable instructions 420. The VDs (e.g., 410–412) are associated with one or more storage devices (e.g., 401–402). Furthermore, the VDs (e.g., 410–412) are associated with a plurality of states, a snapshot operation, a prepare operation, and optionally a restore operation.

In one embodiment, the storage management set of executable instructions 430 is a VM operating in shared storage environment, such as SAN environment or a TCP/IP environment using iSCSI. The storage management set of executable instructions 430 manages the VDs (e.g., 410–412) and is dynamically configured when the one or more of the operations are performed against the VDs (e.g., 410–412). For example, if a snapshot operation completes against the VDs (e.g., 410–412), then the resulting frozen image is imported into the storage management set of executable instructions 430 such that the produced frozen image is visible and accessible to the storage management set of executable instructions 430. The resulting frozen image can also be imported onto a host-computing device.

The selection set of executable instructions 420 permits the selective execution of the operations, if the states have current values that permit the selective execution of the operations. In some embodiments, the operations permit the VDs (e.g., 410–412) to be prepared for an establish operation or a split operation to a second VD (e.g., 410 or 412) or re-prepared on the second VD (e.g., 410 or 412). In more embodiments, the operations permit a second VD (e.g., 410 or 412) to restore the data of other VDs (e.g., 410 or 412), where the second VD (e.g., 410 or 412) represents a frozen image of a previously taken VD (e.g., 410 or 412). Moreover, the snapshot operations permit the creation of a frozen image of the VDs (e.g., 410–412). In one embodiment, the selection set of executable instructions is implemented as a Graphical User Interface (GUI) tool, where a storage administrator can selectively identify and execute the operations. Furthermore, in some embodiments, the GUI tool allows the storage administrator to manually select a target VD (e.g., 410 or 412) or storage pool that houses results acquired from selectively executing the operations against the VDs (e.g., 410–412).

Each of the states includes a value, and the value provides an indication of the operations that can be performed against the VDs (e.g., 410–412) at any particular moment. In one embodiment, a number of the values are predetermined and assigned to the states based on a storage device type. The storage device type can be assigned based on the supported services provided by the storage devices (e.g., 401–402). The storage device type can also identify a particular vendor associated with a particular storage device (e.g., 401 or 402), a particular configuration associated with a storage device (e.g., 401 or 402), or particular interface provided by a storage device (e.g., 401 or 402).

Moreover in some embodiments, a single VD (e.g., 410 or 412) can include a group of VDs (e.g., 410–412). In these embodiments, the storage management set of executable instructions 430 can be configured to not perform any of the operations that are not supported by each of the VDs (e.g., 410–412) that comprise the group of VDs (e.g., 410–412). For example, if the selection set of executable instructions 420 attempts to selectively execute a non-supported operation against the group of VDs (e.g., 410–412), then the storage management set of executable instructions 430 is configured to not perform the non-supported operation, if any VD (e.g., 410 or 412) within the group does not support the operation. In this way, a single VD (e.g., 410 or 412) can be associated with a plurality of disparate storage devices (e.g., 401–402). As a result, the storage management set of executable instructions 430 is assured that no operation is performed on the single VD (e.g., 410 or 412) that would not successfully complete on each of the VDs (e.g., 410–412). In some cases, the non-supported operation can be held in abeyance until the values for the states permit the non-supported operation to be performed.

Figure 5:
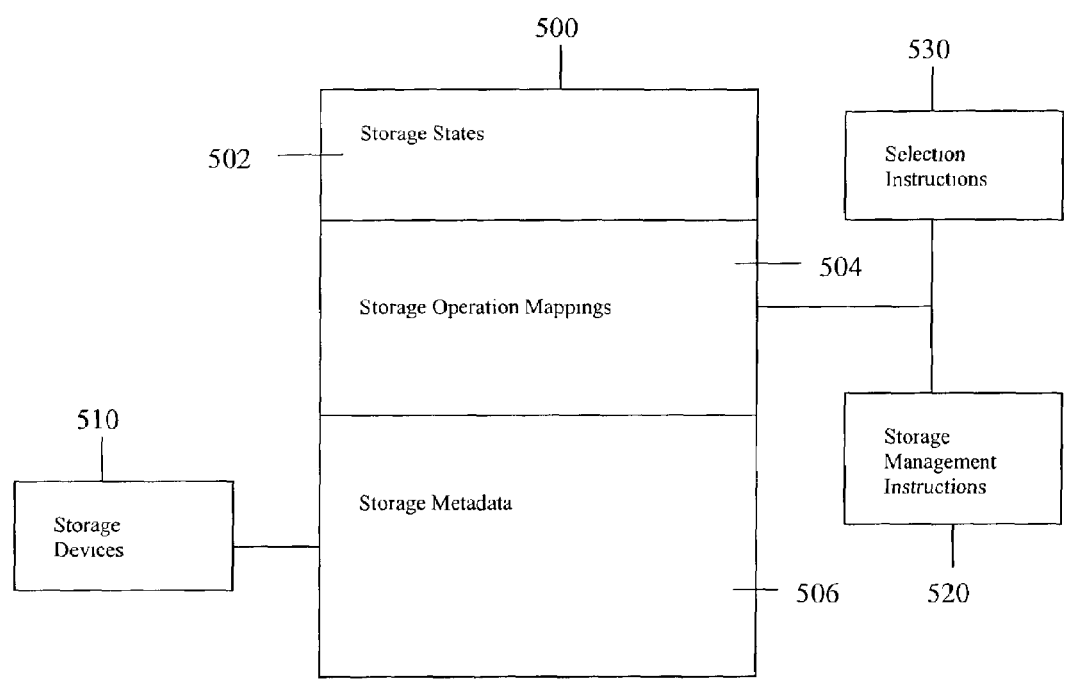
FIG. 5 shows a diagram of a virtual disk data structure, according to the present invention.

FIG. 5 illustrates a diagram of one VD data structure 500, according to the present invention. The VD data structure 500 includes storage metadata 506, a plurality of storage states 502, and a plurality of storage operation mappings 504. The storage metadata is associated with physical storage locations (e.g., storage addresses) that reside on one or more storage devices 510. The physical storage locations house storage data. The storage metadata 506 includes information sufficient to acquire the physical storage data when a referencing application requests the physical storage data from the VD data structure 500. The storage states 502 are associated with processing states of the VD data structure 500. Further, values assigned to the storage states 502, at any particular moment in time, determine which of the storage operations that can be successfully processed by accessing the storage operation mappings 504. Additionally, in some embodiments, the storage device's 510 proprietary interfaces or a storage administrator can automatically or manually set the values assigned to the various storage states 502. This can be desirable when particular storage operations are not supported by a configuration of the storage devices 510, or are not supported by interfaces associated with the storage devices 510.

In one embodiment, the storage operation mappings 504 are accessible to a storage management set of executable instructions 520 (e.g., VMs and the like) in order to execute storage operations. In more embodiments, the storage operation mappings 504 are accessible to a selection set of executable instructions 530, such as when a storage administrator is attempting to perform a number of storage operations manually and/or independent of any automatic execution of operations by the storage management set of executable instructions 520.

Also, in some embodiments, a number of the storage operations permit a frozen image of the storage data 506 to be acquired using the VD data structure 500 and transferred to one or more second VD data structures 506. In other embodiments, a number of the storage operations permit a previously taken frozen image associated with a second VD data structure 500 to be restored in an original VD data structure 506. Moreover, a single VD data structure 506 can be used to represent a plurality of instances of VD data structures 506. In some embodiments, the VD data structure 500 resides in volatile memory, such as a cache. Although, it is readily apparent to one of ordinary skill in the art that the VD data structure 500 can reside in non-volatile memory or a combination of volatile and non-volatile memories.

Figure 6:
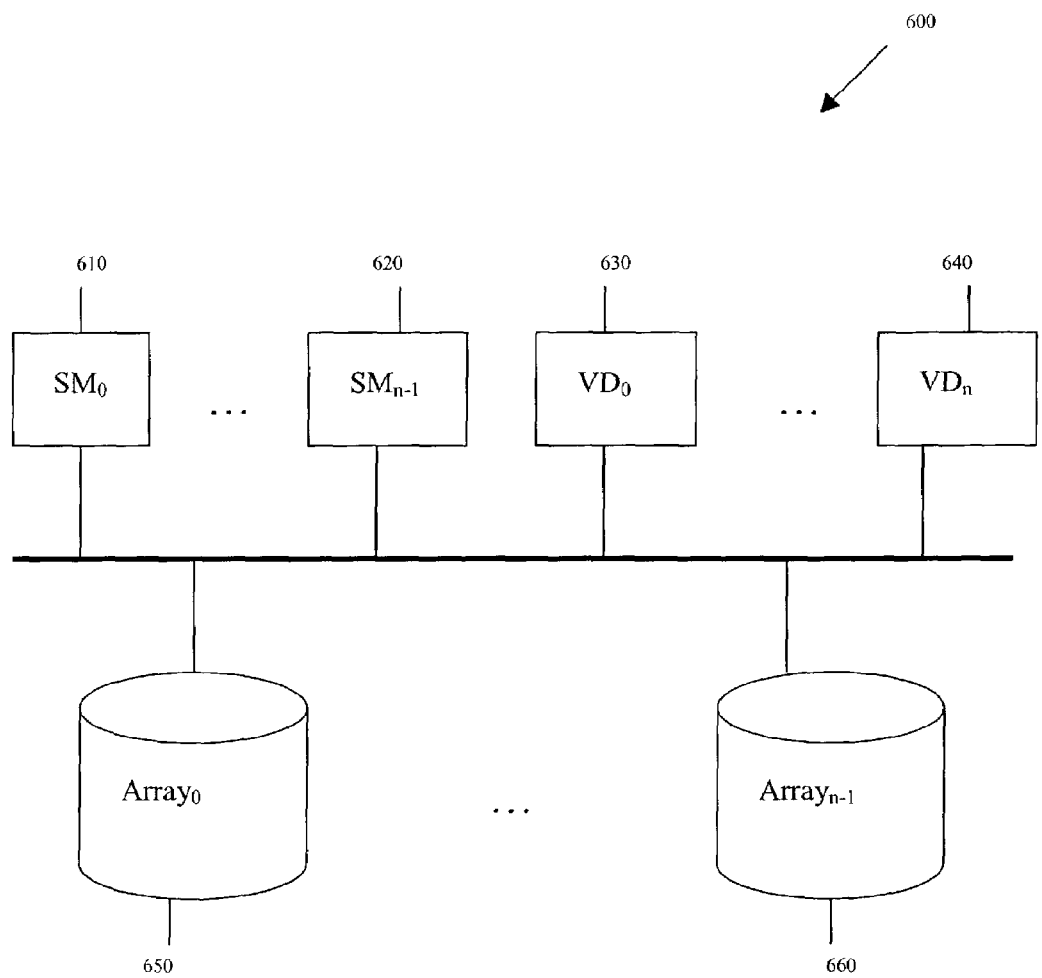
FIG. 6 shows a diagram of another storage operation system, according to the present invention.

FIG. 6 illustrates a diagram of another storage operation system 600, according to the present invention. The storage operation system 600 includes a number of storage management applications (e.g., 610 and 620), a number of virtual disks (e.g., 630 and 640), and a number of storage arrays (e.g., 650 and 660). The storage management applications (e.g., 610 and 620) interact with the virtual disks (e.g., 630 and 640) when storage management operations are requested by applications. Requests can be received from host applications.

The virtual disks (e.g., 630 and 640) also include storage management states and interfaces to storage management operations. The storage management operations interact with calling syntaxes and modules residing on the storage arrays (e.g., 650 and 660). As storage conditions change on the storage arrays (e.g., 650 and 660), the states of the virtual disks (e.g., 630 and 640) are updated dynamically (e.g., event driven). The storage management states will dictates whether storage management operations can be permissibly performed against the virtual disks (e.g., 630 and 650) at any particular moment in time by the storage management applications (e.g., 610 and 620).

In some embodiments, a single storage management application (e.g., 610 or 620) interacts with a plurality of virtual disks (e.g., 630 and 640). Moreover, each of the storage arrays (e.g., 650 and 660) include calling syntaxes and storage management modules that are disparate from one another, such as when each of the storage arrays (e.g., 650 and 660) are provided by different vendors, or are different versions of a storage array (e.g., 650 or 660) provided by the same vendor.

Each of the virtual disks (e.g., 630 and 640) are linked and associated with translating or provider modules that normalize calling syntaxes and module names associated with the disparate storage array interfaces (e.g., 650 and 660). Thus, the storage management applications (e.g., 610 and 620) need not be concerned with the particular calling syntaxes and module names associated with standard storage management operations. In this way, the storage management applications can be developed such that the interfaces associated with the disparate storage arrays (e.g., 650 and 660) are decoupled and independent of the storage arrays' interfaces.

CONCLUSION

Storage services and systems discussed above permit improved storage operations in a heterogeneous shared storage environment. These services and systems include methods, systems, and virtual data structures that permit storage management applications and user/client or host applications to use consistent and normalized interfaces when creating frozen images (e.g., snapshot operations) of storage or performing other storage operations (e.g., splits and mirrors). Moreover, a single virtual data structure can include a plurality of virtual data structures, which are associated with a plurality of disparate physical storage devices. Each virtual data structure is associated with storage states and storage operations. In some embodiments, if a particular operation is not supported by at least one of the associated underlying physical storage device configurations or interfaces, then the non-supported operation is automatically not available for use by the entire virtual data structure. Furthermore, in some embodiments, a GUI allows user/client or host applications the ability to selectively execute the storage operations associated with the VD data structures.

As one of ordinary skill in the art now appreciates upon reading the present disclosure, the methods, systems, and data structures presented in this disclosure permit more flexible implementations of storage management, user/client, and/or host applications. Furthermore, the applications are easier to develop and maintain. Moreover, the storage management applications are more robust, capable of more easily integrating with a plurality of interfaces associated with disparate configurations and/or disparate vendors of the underlying physical storage devices.

Although specific embodiments have been illustrated and described herein, it will be appreciated by one of ordinary skill in the art that any arrangement that is calculated to achieve the same purpose may be substituted for the specific embodiments shown. This application is intended to cover any adaptations of the present invention. Therefore, it is intended that this invention be limited only by the claims and the equivalents thereof.

What is claimed is:

1. A method to provide storage operations, comprising:
providing a virtual disk with access to perform a snapshot operation, wherein the virtual disk logically represents storage data on one or more storage devices, wherein the snapshot operation is operable to copy the storage data;
associating state information with the virtual disk, wherein the state information indicates whether the virtual disk is in a state that permits the snapshot operation to be performed;
receiving a request for the snapshot operation to be performed; and
performing the snapshot operation in response to determining that the state information indicates that the virtual disk is in a state that permits the snapshot operation to be performed.

2. The method of claim 1, wherein the virtual disk is a first virtual disk in a group of virtual disks, wherein the state information associated with the first virtual disk indicates whether every virtual disk in the group is in a state that permits the snapshot operation to be performed on the virtual disk.

3. The method of claim 1, further comprising:
providing the virtual disk with access to perform a restore operation, wherein the restore operation is operable to restore storage data previously copied by the snapshot operation to the one or more storage devices;
wherein the state information further indicates whether the virtual disk is in a state that permits the restore operation to be performed.

4. The method of claim 1, wherein the one or more storage devices include a first storage array and a second storage array, wherein the first storage array is a different type of storage array than the second storage array.

5. A storage operation system, comprising:
one or more storage devices;
a virtual disk that logically represents storage data on the one or more storage devices, wherein the virtual disk has associated state information that indicates whether the virtual disk is in a state that permits a snapshot operation to be performed;
a storage management set of executable instructions operable to perform the snapshot operation against the virtual disk in response to determining that the state information associated with the virtual disk permits the snapshot operation to be performed, wherein the snapshot operation is operable to copy the storage data; and
a selection set of executable instructions that permits selective execution of the snapshot operation.

6. The storage operation system of claim 5, wherein performing the snapshot operation comprises at least one of mirroring the virtual disk to a second virtual disk and backing up the virtual disk to the second virtual disk.

7. The storage operation system of claim 5, wherein the state information is set at least in part based on a type associated with one or more of the one or more of the storage devices.

8. The storage operation system of claim 5, wherein the selection set of executable instructions permits selection of a target virtual disk or a storage pool to be used when selectively executing the snapshot operation against the virtual disk.

9. The storage operation system of claim 5, wherein the virtual disk is a first virtual disk in a group of virtual disks, wherein the state information of the first virtual disk indicates whether every virtual disk in the group is in a state that permits the snapshot operation to be performed on the virtual disk.

10. The storage operation system of claim 5, wherein the virtual disk, the storage management set of executable instructions, and the selection set of executable instructions participate in a shared storage environment.

11. The storage operation system of claim 5, wherein the selection set of executable instructions is a graphical user interface (GUI) set of executable instructions.

12. A virtual disk data structure residing on a computer readable medium, comprising:
storage metadata associated with a plurality of storage devices, wherein the metadata logically represents storage data residing on the storage devices;
state information indicating whether the virtual disk data structure is in a state that permits a snapshot operation to be performed to copy the storage data;
a plurality of storage operation mappings providing access to process a plurality of storage operations, wherein the storage operation mappings include a first storage operation mapping that indicates whether the snapshot operation can be performed, based on the state information.

13. The virtual disk data structure of claim 12, wherein the plurality of storage operation mappings is accessible to a storage management set of executable instructions.

14. The virtual disk data structure of claim 12, wherein the state information is determined by interfaces associated with a plurality of the storage devices.

15. The virtual disk data structure of claim 12, wherein the plurality of storage operation mappings is accessible to a selection set of executable instructions.

16. The virtual disk data structure of claim 12, wherein the snapshot operation is operable to create a frozen image of the storage data.

17. The virtual disk data structure of claim 12, wherein the virtual disk data structure resides in a volatile memory.

* * * * *